US007581677B2

(12) United States Patent
Haas et al.

(10) Patent No.: US 7,581,677 B2
(45) **Date of Patent: *Sep. 1, 2009**

(54) VOTE BY MAIL ENVELOPE THAT PROTECTS PRIVACY OF VOTER'S SIGNATURE

(75) Inventors: Bertrand Haas, New Haven, CT (US); Jay Reichelsheimer, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 332 days.

This patent is subject to a terminal disclaimer.

(21) Appl. No.: 11/641,207

(22) Filed: Dec. 19, 2006

(65) Prior Publication Data

US 2008/0143096 A1 Jun. 19, 2008

(51) Int. Cl.

*G06K 17/00* (2006.01)
*G07C 13/00* (2006.01)
*G06K 7/10* (2006.01)
*G06K 19/06* (2006.01)

(52) U.S. Cl. ....................... 235/386; 235/454; 235/491; 705/12

(58) Field of Classification Search ................. 235/386, 235/454, 491; 283/116; 229/71, 300, 301, 229/303, 304; 705/12

See application file for complete search history.

(56) References Cited

U.S. PATENT DOCUMENTS 3,186,735 A * 6/1965 Hanrahan .................... 462/64
3,652,007 A * 3/1972 MacDougall ............... 229/304
4,597,591 A 7/1986 Gendron et al.
5,015,318 A * 5/1991 Smits et al. ................. 156/233
5,288,994 A 2/1994 Berson
5,294,470 A * 3/1994 Ewan ........................ 428/41.6
5,811,792 A * 9/1998 Verschuur et al. ....... 250/223 R
6,447,015 B1 * 9/2002 Linnewiel .................... 283/81
7,240,835 B2 * 7/2007 Brucker et al. .............. 235/386
2003/0202690 A1 * 10/2003 Jones et al. ................ 382/139
2005/0061866 A1 3/2005 Ackley et al.
2007/0095908 A1 5/2007 Haas et al.
2008/0121680 A1 5/2008 Quine et al.
2008/0136162 A1 6/2008 Haas et al.
2008/0142594 A1 6/2008 Haas et al.
2008/0156862 A1 7/2008 Haas et al.

* cited by examiner

*Primary Examiner*—Thien M. Le
*Assistant Examiner*—Tuyen K Vo
(74) *Attorney, Agent, or Firm*—Brian A. Lemm; Angelo N. Chaclas

(57) ABSTRACT

Methods and systems that provide privacy of signatures on envelopes containing ballots are provided. The envelope for returning ballots includes a flap with a window that aligns with a signature area on the envelope. The window appears opaque under normal lighting conditions, but appears transparent when illuminated with light within a predetermined band of wavelengths. To read the signature, light having wavelength within the predetermined band can be directed onto the window, thereby rendering the window transparent and the signature visible.

7 Claims, 7 Drawing Sheets

VOTE BY MAIL ENVELOPE THAT PROTECTS PRIVACY OF VOTER'S SIGNATURE

FIELD OF THE INVENTION

The invention disclosed herein relates generally to voting systems, and more particularly to a method and system for protecting privacy of signatures on ballots sent through the mail.

BACKGROUND OF THE INVENTION

In democratic countries, governmental officials are chosen by the citizens in an election. Conducting an election and voting for candidates for public office in the United States can be performed in several different ways. One such way utilizes mechanical voting machines at predetermined polling places. When potential voters enter the predetermined polling place, voting personnel verify that each voter is properly registered in that voting district and that they have not already voted in that election. Thus, for a voter to cast his vote, he must go to the polling place at which he is registered, based on the voter's residence. Another method for conducting an election and voting utilizes paper ballots that are mailed to the voter. The voter marks the ballot and returns the ballot through the mail. Mailed ballots have been historically reserved for absentee voting. In the usual absentee voting process, the voter marks the ballot to cast his/her vote and then inserts the ballot in a return envelope which is typically pre-addressed to the voter registrar office in the corresponding county, town or locality in which the voter is registered. The voter typically appends his/her signature on the back of the envelope adjacent to his/her human or machine readable identification.

When the return envelope is received at the registrar's office, a voting official compares the voter signature on the envelope with the voter signature retrieved from the registration file to make a determination as to whether or not the identification information and signature are authentic and valid, and therefore the vote included in the envelope should be counted. If the identification information and signature are deemed to be authentic and valid, the identifying information and signature are separated from the sealed ballot before it is handed to the ballot counters for tabulation. In this manner, the privacy of the voter's selections is maintained and thus the ballot remains a "secret ballot."

One general problem with vote by mail envelopes is the signature is in the open and exposed for all to see throughout the process for determining whether or not the vote is authentic. This leads to potential privacy issues and concerns, e.g., fraudulent usage of a voter's signature. Some jurisdictions have required that such signatures be hidden from plain sight while the envelope is en route from the voter to the registrar's office. This will protect against easy imaging of the signature, such as, for example, with a hand scanner or digital camera, for later impersonation or other fraudulent purposes, e.g., identity theft. To comply with such requirements, envelopes have been proposed that hide the signature with a flap which is removed when the envelope is received at the registrar's office. These solutions, however, require some mechanical manipulation of the envelopes, which is both expensive and increases the risk of accidental tears of the envelope, potentially leading to damage to the ballots contained in the envelopes, exposing the marked ballot before the conclusion of the authentication process (which in some states require the ballot to be counted, regardless of the outcome of the authentication process), or leading to the ability to link the voter with his/her ballot, thereby removing the secret ballot.

Voting by mail is becoming more prevalent, apart from the usual absentee voting, and in some jurisdictions, entire elections are being conducted exclusively by mail. As voting by mail becomes more prevalent, the privacy concerns discussed above are also more prevalent. Thus, there exists a need for efficient methods and systems that can protect the privacy of signatures on ballots sent through the mail while also reducing the risk of damage to the ballots when the signatures are revealed.

SUMMARY OF THE INVENTION

The present invention alleviates the problems associated with the prior art and provides methods and systems that protect the privacy of signatures for ballots sent through the mail while also reducing the risk of damage to the ballots when the signatures are revealed.

In accordance with the present invention, the envelope for returning ballots by mail includes a signature area. The signature area is preferably formed of a material that is reflective to one or more specific ranges of wavelengths of light. The flap of the envelope includes a window such that when the flap is in a closed position, the window aligns with the signature area. The window is formed of a filtering material that limits the average light transmission within the visible light spectrum, except for one or more predetermined band(s), and therefore will appear opaque under normal lighting conditions, i.e., white light. When the filter is illuminated substantially by light with wavelengths in the predetermined band(s), the window will transmit the light and therefore will appear transparent.

The flap of the envelope is then sealed, thereby covering the voter's signature in the signature area with the window of the envelope flap. Since the window appears opaque under normal lighting conditions, the voter's signature will be concealed by the window and thus will not be visible. Upon receipt at the registrar's office (or other official vote tallying location), light having a wavelength within the predetermined band(s) can be directed onto the window, thereby rendering the window transparent. The light will be absorbed (or alternatively reflected) where the signature was imprinted on the signature area and reflected (or alternatively absorbed) elsewhere, resulting in the voter's signature being visible through the window of the envelope flap. The voter's signature can then be read for comparison with official records to perform the required signature verification to determine validity and authenticity of the ballot. Thus, while the envelope is en route from the voter to the registrar's office, the voter's signature will be concealed from plain view. Viewing of the signature does not require any mechanical manipulation of the envelope or flaps on the envelope, thereby reducing the risk of causing damage to the ballot contained therein. After positive verification of the voter's signature, the ballot can be separated from the envelope and provided to the ballot counters for tabulation.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1:
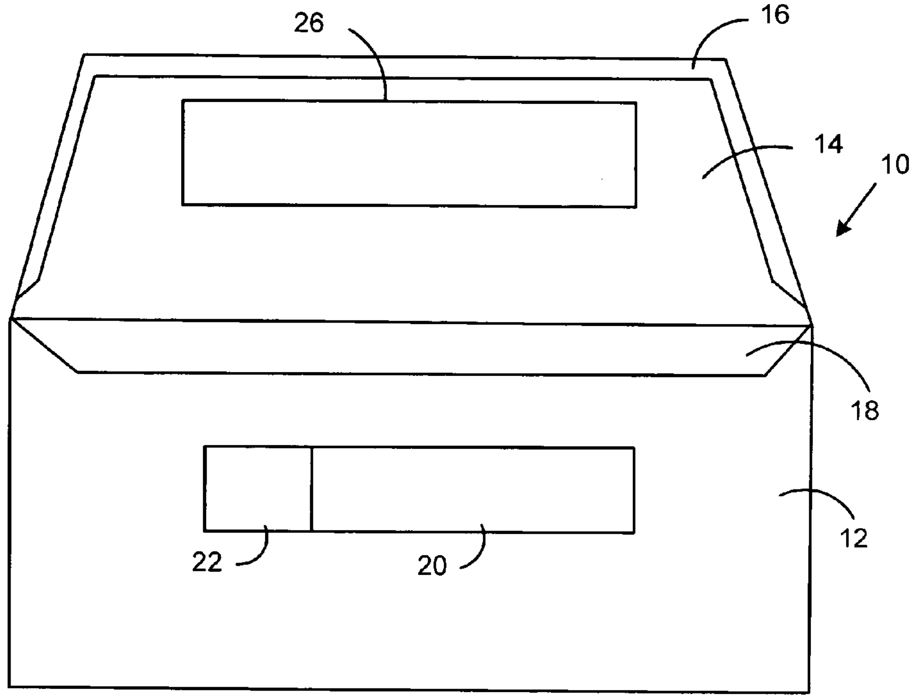
FIG. 1 illustrates an envelope, according to an embodiment of the present invention, for returning ballots by mail in an open position.
Figure 2:
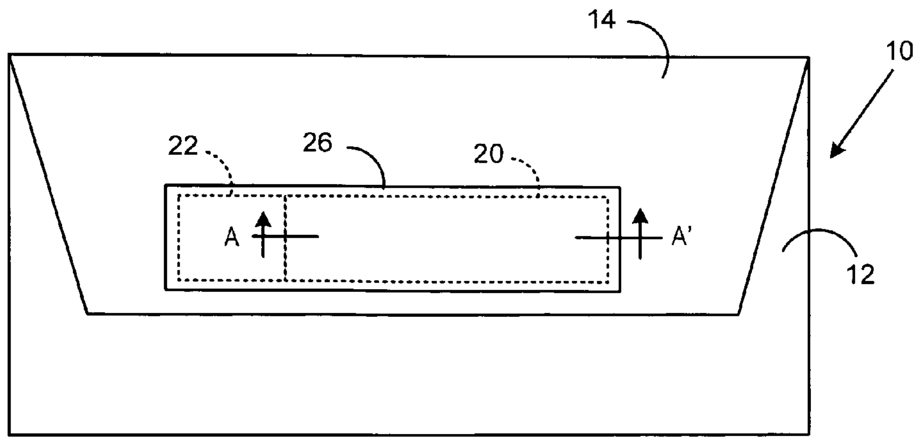
FIG. 2 illustrates the envelope of FIG. 1 in a closed position.

In describing the present invention, reference is made to the drawings, wherein there is seen in FIG. 1 an envelope 10 for returning ballots by mail according to an embodiment of the present invention in an open position. While the present description is directed to an envelope for returning ballots by mail, it should be understood that the invention is not so limited and the envelope 10 could be used to hold any type of communication or material. Envelope 10 includes a body portion 12 and a flap portion 14 connected to the body portion 12. When the flap portion 14 is in an open position as illustrated in FIG. 1, contents, such as, for example, a ballot, can be inserted into a pocket 18 formed by the body portion 12. The flap portion 14 can then be moved to a closed position (as illustrated in FIG. 2), and sealed utilizing a glue or sealing strip 16 which when activated will adhere the flap portion 14 to the body portion 12, thereby covering the pocket 18 and preventing the contents therein from falling out.

The body portion 12 is provided with a signature area 20 intended for the voter's signature. Signature area 20 is preferably formed from a reflective material or is enhanced, such as with a chemical or paper coating, in a manner which optimizes the reflectivity. The signature area 20 may be a separate material provided on a label or the like that is applied to the body portion 12, or alternatively may be formed from a material deposited directly to the body portion 12 using a suitable process, such as, for example, ink jet printing or the like. For example, the signature area could be formed of standard optical brightener dyes deposited on the body portion 12 of the envelope 10. The use of a reflective material for the signature area 20 will aid in the reading of a signature as described below. It should be noted, however, that no additional reflective material is required for the signature area 20 if the body portion 12 of the envelope 10 is sufficiently reflective.

An area 22 for information that identifies the voter may also be provided adjacent to the signature area 20. Such information can include, for example, the voter's name and address, and is preferably provided in some machine readable form such as a barcode. The identification information is preferably printed using an ink that is absorptive of light, such as for example a blue or black ink, or alternatively on an adhesive label that the voter applies to the body portion 12 adjacent to the signature area 20 in the identification area 22. Alternatively, the voter identification information could be printed on the flap portion 14 or elsewhere on the body portion 12 such that it can be viewed when the flap portion 14 is in the closed position as illustrated in FIG. 2.

Figure 3:
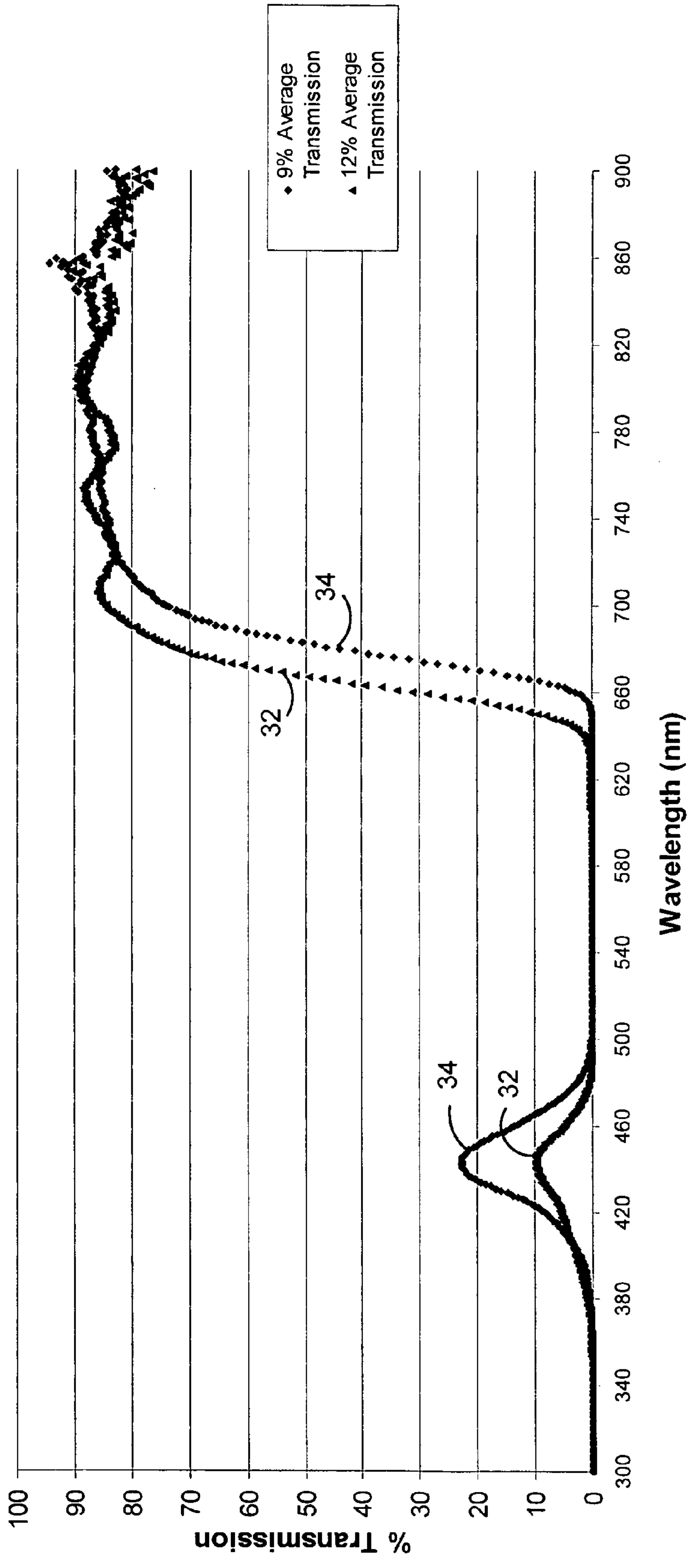
FIG. 3 illustrates the transmission rate of two exemplary windows that can be utilized in the present invention.

The flap portion includes a window 26 that corresponds with the signature area 20 and identification area 22 of the body portion 12 when the flap portion 14 is in the closed position. Strip 16 preferably extends along the sides of flap portion 14, thereby preventing access to the signature area 20 and identification area 22 through the side of the flap portion 14. The window 26 is formed from any suitable material, such as, for example, a polymeric film that is impregnated with one or more dyes that limits the average transmission of light in the human visible spectrum, i.e., approximately 400 to 700 nm, such that the window 26 appears opaque when illuminated by white light. White light includes all light that is a mixture of wavelengths of various colors and is perceived as colorless, such as, for example and without limitation, sunlight, fluorescent light, halogen light, incandescent light and the like. The transmission of light through the window 26 is not limited in one or more predetermined bands of visible light that are significantly smaller than the full spectrum of visible light. FIG. 3 illustrates the transmission rates 32, 34 of two exemplary windows 26 that can be utilized in envelope 10. As illustrated in FIG. 3, a first exemplary window 26 has a transmission rate identified by curve 32 and a second exemplary window 26 has a transmission rate identified by curve 34. The average light transmission across the visible spectrum for curve 32 is approximately 12%, while the average light transmission across the visible spectrum for curve 34 is approximately 9%. The average light transmission across the visible spectrum is obtained by adding the amount of light transmitted at each individual wavelength across the visible spectrum, e.g., 400 to 700 nm, and dividing by the total number of wavelengths sampled, e.g., 301.

As further shown in FIG. 3, the exemplary windows 26 represented by both curves 32, 34 transmit very little to no light in the wavelength band between approximately 480 nm to 640 nm, transmit some light in the wavelength band between 400 and 480, and allow increasing transmission above 640 nm to more than 60% transmission at approximately 680 nm. Because the average transmission rates are relatively low (both less than approximately 12%), a window 26 having either of the transmission curves 32, 34 will appear opaque under normal lighting conditions, e.g., white light, as the amount of light absorbed or reflected in the visible spectrum is far greater than the amount of light being transmitted. However, when illuminated by light having wavelengths of between approximately 640 and 700 nm, a window 26 having either of the transmission curves 32, 34 will have a transmission rate within that band of wavelengths such that the window 26 will appear at least partially transparent. An average transmission of less than approximately 19% is sufficient to provide the necessary opacity for the window 26, but preferably the average transmission rate across the visible spectrum is less than approximately 12%.

Figure 4:
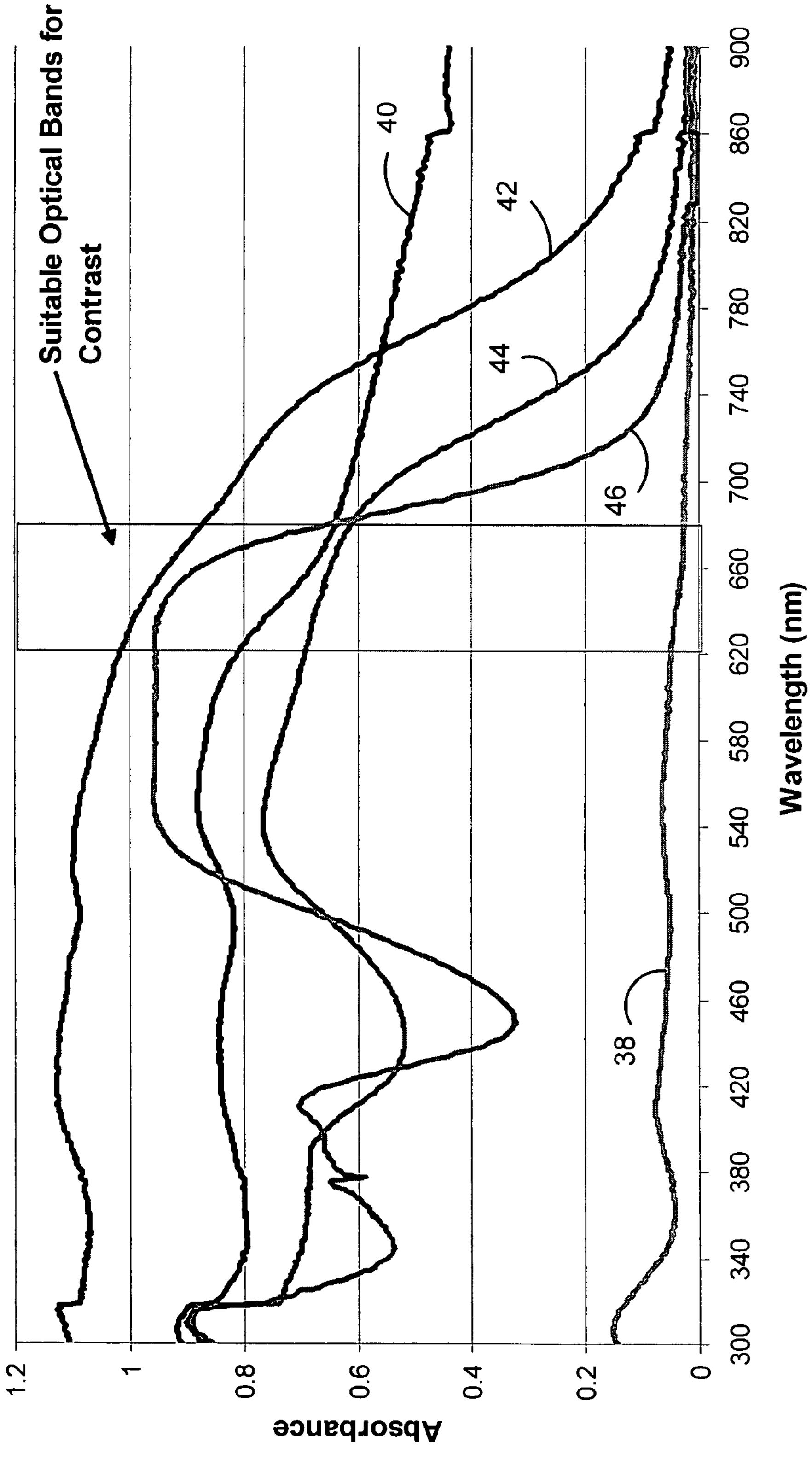
FIG. 4 illustrates absorption rates of a representative sample of inks along with an exemplary optical band for transmission.

The selected wavelength band(s) in which the window 26 transmits light is based on the absorption properties of the ink colors that would be expected to be used by a typical voter when signing in the signature area 20, thereby providing sufficient contrast between the signature and background for the signature to be read. For example, if the predetermined band encompasses wavelengths in which inks expected to be used are reflective, the signature will not be able to be read even when illuminated by light within the predetermined band. While the light will pass through the window 26, it will be reflected by both the signature and background, thereby providing insufficient contrast between them. If, however the band(s) selected were too large, the window 26 may not appear opaque in white light, but may instead appear translucent. It is therefore desirable to select a band of wavelengths that is not too large but still is sufficiently absorbed by typical inks that would be expected to be used when providing a signature. Most inks are absorptive in a rather wide range of wavelengths. FIG. 4 illustrates absorption rates of a representative sample of inks, and more specifically a black ballpoint pen 40, a black marker 42, a blue ballpoint pen 44 and a blue marker 46, that would typically be used for signing the envelope 10 in the signature area 20, as well as white paper 38. As can be seen from FIG. 4, the white paper 38, being reflective, absorbs very little of light of any wavelength. The other inks shown in FIG. 4 have varying absorbance levels depending upon the wavelength of light. The selection of the wavelength band must be large enough such that the absorption rate is above a certain threshold for all of the typical inks (for example, 0.6 in FIG. 4) within the band, but still narrow enough such that under white light the window 26 will appear as opaque. One such suitable band, as illustrated in FIG. 4, is from approximately 620 to 680 nm. Thus for example, a window 26 having either transmission rate 32, 34 as illustrated in FIG. 3 will provide suitable filtering properties such that the window 26 will appear opaque under normal lighting conditions, e.g., white light. When illuminated with light in the band of approximately 620 to 680 nm, the window 26 will appear at least partially transparent. The light in the band will be absorbed by most of the ink colors that would typically be used for providing a signature (as shown in FIG. 4), thereby providing sufficient contrast such that the signature could be read through the window.

Figure 5:
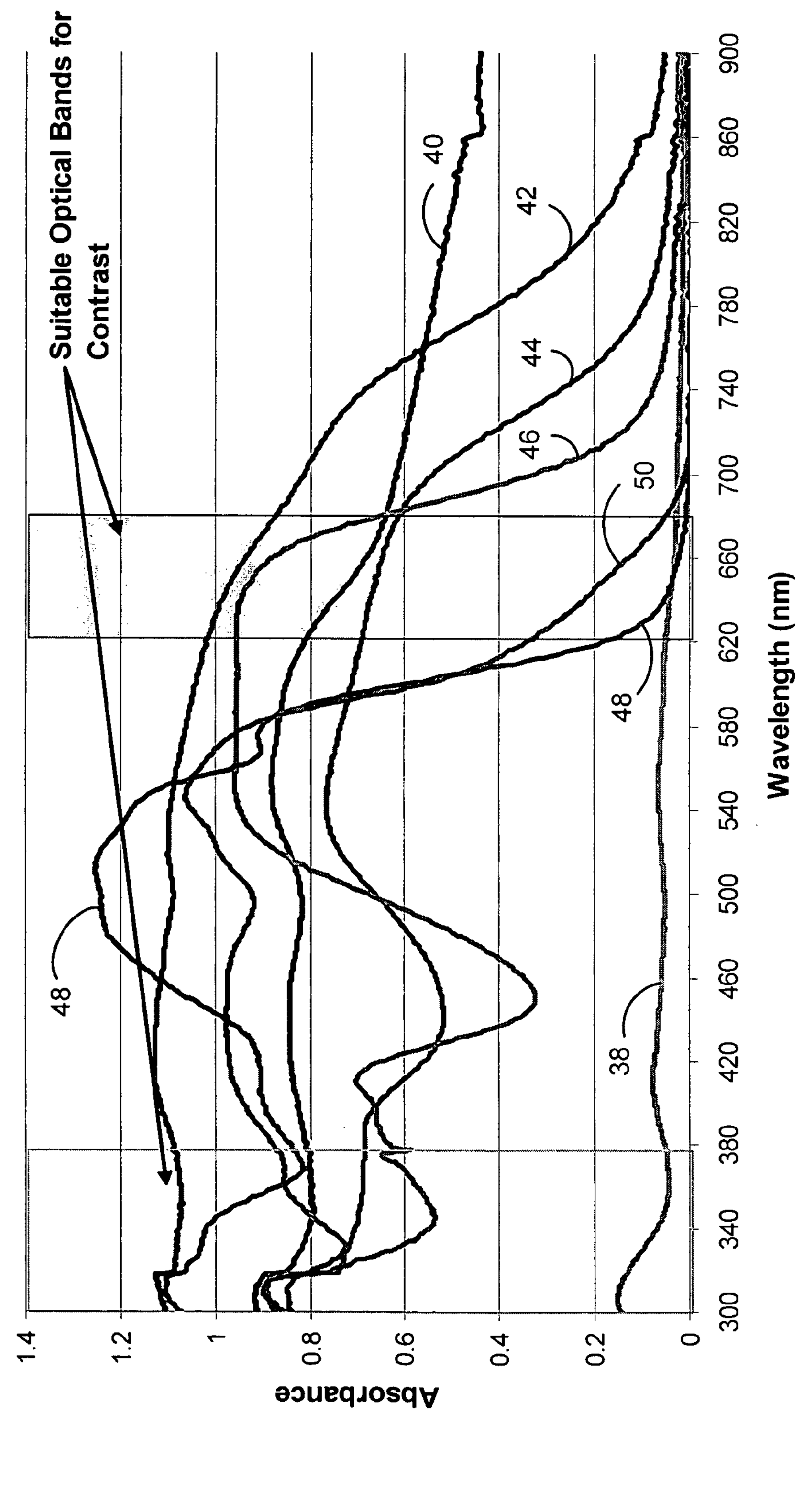
FIG. 5 illustrates absorption rates of a representative sample of inks along with two exemplary optical bands for transmission.

Other suitable bands could also be selected for the window 26, provided the selection criteria as described above is satisfied. For example, it may be desirable to allow the voter to sign using a red ink as well as a blue or black ink. FIG. 5 is similar to FIG. 4, but also includes the absorption of a red marker 48 and a red pen 50. In this situation, two different bands can be selected, such as, for example, a first band of wavelengths of approximately 620 to 680 nm for the blue and black inks, and a second band of wavelengths of approximately 300 to 380 nm for the red inks. Of course, the transmission rate of the window 26 would also have to be suitable for those bands.

Referring again to FIG. 2, when the flap portion 14 is folded over the body portion 12, the window 26 covers the signature area 20 (and possibly the identification area 22) on the body portion 12 of the envelope 10. Because of the filtering properties of the window 26, when the window 26 is illuminated by white light, a substantial portion, outside of the predetermined band, of the light will be reflected and/or absorbed and the window 26 will appear as opaque. When the window 26 is illuminated by light within the predetermined band or bands, it will pass the light through and appear at least partially transparent. The signature in the signature area 20 can then be read as described further below.

Figure 6:
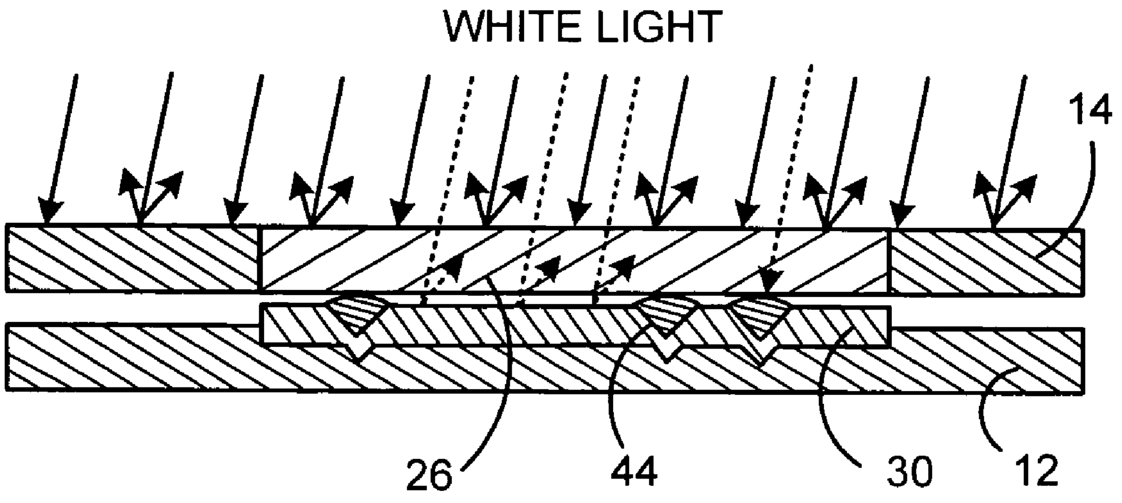
FIG. 6 illustrates a cross-sectional view along line A-A' of FIG. 2 when illuminated by white light.
Figure 7:
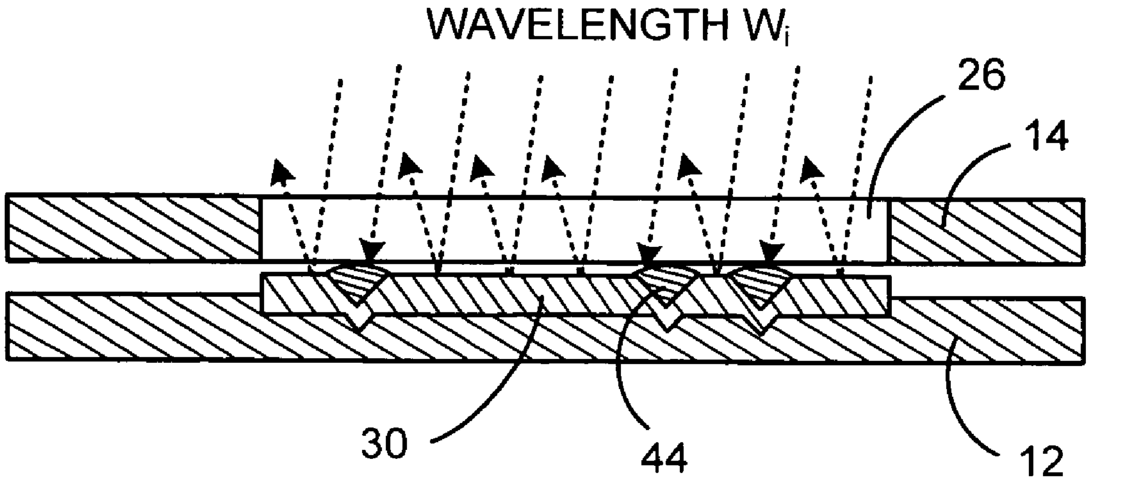
FIG. 7 illustrates a cross-sectional view along line A-A' of FIG. 2 when illuminated by light within the optical band for transmission.

FIG. 6 illustrates a cross-sectional view along line A-A' in FIG. 2 of the signature area 20 when illuminated by white light. As shown in FIG. 6, the window 26 of flap 14 covers the signature area 20 in which the voter has deposited ink (designated 44) when signing his or her signature. As can be seen in FIG. 6, when white light strikes the window 26, the window 26 will transmit only that portion of the white light in the predetermined band (designated by the dotted lines in FIG. 50, while reflecting or absorbing a substantial portion of the white light (indicated by the solid lines in FIG. 6). Because of the significant amount of light either reflected or absorbed by the window 26, the window 26 will appear as opaque. Thus, the signature area 20 beneath the window 26 (and the identification area 22 if provided adjacent to the signature area 20) will not be visible and can not be read. FIG. 7 illustrates the cross-sectional view of the signature area 20 illustrated in FIG. 6 when illuminated by light having wavelengths $W_i$ that are within the predetermined band that the window 26 will transmit. As can be seen in FIG. 7, light having wavelength $W_i$ is passed through the window 26 where it will strike either the signature area 20 and the areas 44 where the ink deposited by the voter is located. The signature area 20, being reflective of light having wavelength $W_i$, will reflect the light back up through the window 26. The areas 44, having the ink that is absorptive of light having wavelength $W_i$, will absorb the light and not reflect it. The areas 44 where the light is absorbed will appear as dark areas, thereby forming an image in the signature area 20 of the signature. The signature can then be read. Similarly, if the identification area 22 is provided adjacent to the signature area 20, the light will be absorbed by the ink used to print the information and reflected elsewhere, thereby forming an image of the identification information that can be read. When the light having wavelength $W_i$ is removed from the signature area 20, the window 26 will again appear as opaque as described above with respect to FIG. 6, and the signature (and identification information) will no longer be able to be read.

Figure 8:
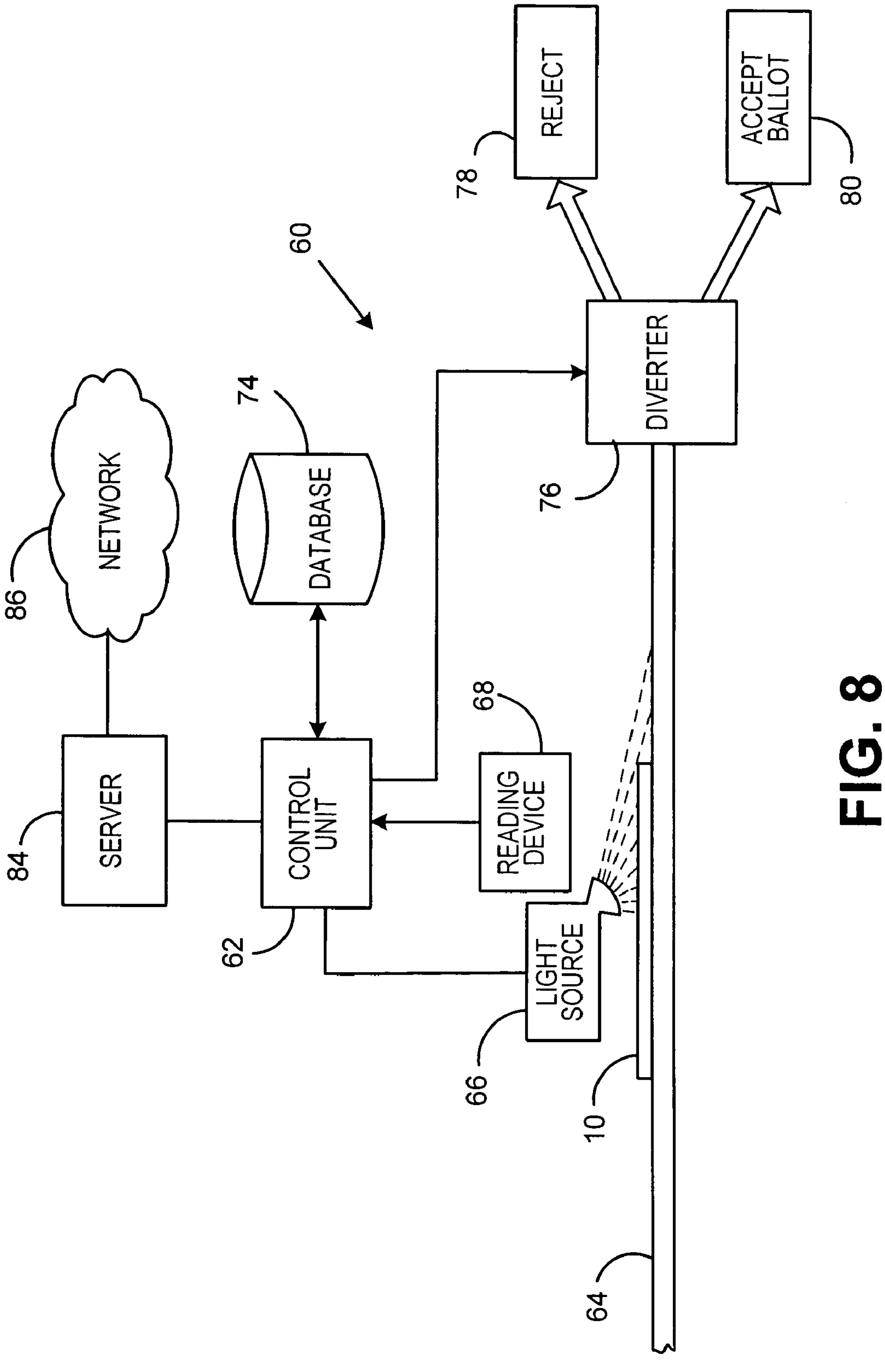
FIG. 8 illustrates in block diagram form a system for viewing the signature according to an embodiment of the present invention.

FIG. 8 illustrates in block diagram form an automated system 60 for viewing the signature concealed using the envelope 10 illustrated in FIGS. 1 and 2 according to an embodiment of the present invention. System 60 includes a control unit 62, such as, for example, a general or special purpose microprocessor or the like, that controls operation of the system 60. Control unit 62 is connected to a database 74, which is used to store voter information, including, for example, name, address, and a reference signature for use in verifying ballots received by mail as described below. A transport 64, such as, for example, rollers and/or belts, is used to transport a series of envelopes 10 (only one shown in FIG. 7) through the system 60. A light source 66 (or multiple sources if necessary for multiple bands) is located adjacent to the transport to illuminate envelope 10 with light having predetermined wavelengths $W_i$ that are within the predetermined band(s) that window 26 will pass. A reading device 68, such as, for example, a scanner, camera, or the like is positioned adjacent to the light source 64 such that images of the envelopes 10 can be read while illuminated by the light source 66. Optionally, the light source 66 and reading device 68 can be located in some type of enclosure to limit the amount of outside light (white light) that will illuminate the envelope 10 during the reading process. Alternatively, the reading device 68 could utilize a lens that will capture only light having the wavelengths $W_i$, thereby removing any interference from outside white light. A diverter 76 is located downstream from the reading device 68 and is coupled to the control unit 62. Based on command signals from the control unit 62, the diverter 76 will divert each envelope to a reject path 78 or an accept ballot path 80 as described below.

Figure 9:
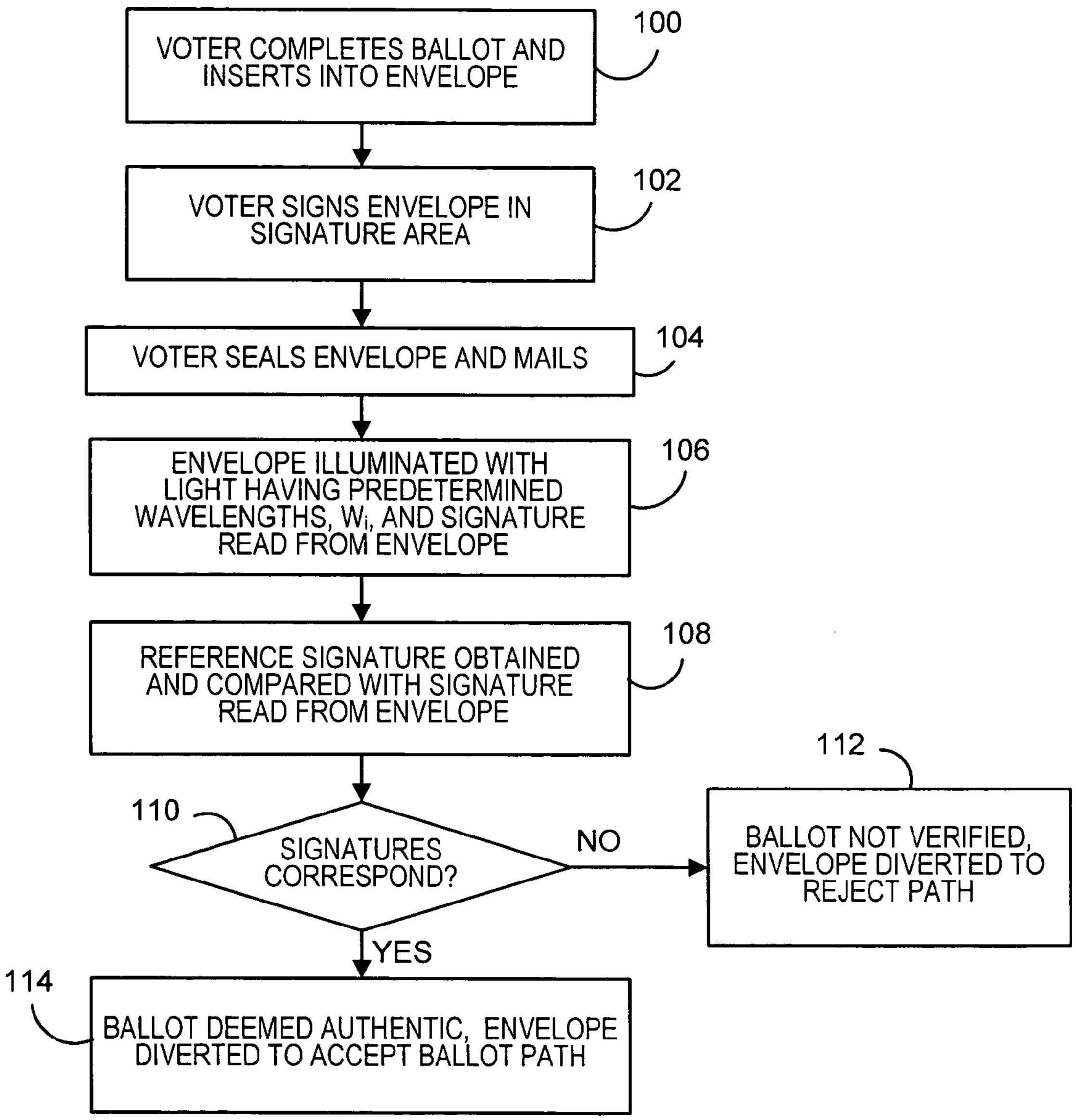
FIG. 9 illustrates in flow diagram form the preparation and processing of an envelope for mailing a ballot according to an embodiment of the present invention.

FIG. 9 illustrates in flow diagram form the preparation and processing of an envelope 10 for mailing a ballot. In step 100, a voter completes a ballot and inserts it into the pocket 18 of envelope 10. In step 102, the voter signs the envelope 10 in the signature area 20. Optionally, the envelope 10 could include instructions to the voter to sign using only a specified ink color, such as, for example, blue or black, to ensure that the ink used will be sufficiently absorptive within the passing band selected for window 26. In step 104, the voter seals the flap portion 14 to the body portion 12 of the envelope 10, thereby covering the signature area 20 with the window 26, and mails the envelope 10 to the registrar's office. The window 26 will conceal the voter's signature in the signature area 20 under normal, e.g., white light, illumination, as described above with respect to FIG. 6. Thus, the privacy of the voter's signature is maintained during transit of the envelope 10 from the voter to the registrar's office.

Upon receipt of the envelope 10 at the registrar's office, the envelope 10 can be processed using the system as illustrated in FIG. 8. In step 106, the envelope 10 is transported by the transport 64 and illuminated by the light source 66 with light having the predetermined wavelengths $W_i$ that are within the predetermined band(s) that window 26 will transmit. Illumination by light having the wavelength(s) $W_i$ will result in the voter's signature being revealed as described above with respect to FIG. 7. The reading device 68 can then read the voter's signature in signature area 20 and the identification information from identification area 22 (regardless of where the identification information is printed on the envelope 10) from the envelope 10. In step 108, the control unit 62 can retrieve the reference signature from the database 74 (based on the identification information included on the envelope 10 for the voter) and compare the reference signature to the signature read from signature area 20 of envelope 10. In step 110, it is determined if the reference signature retrieved from the database 74 corresponds to the signature read from signature area 20 of envelope 10. This can be performed by the control unit 62 or, alternatively, the control unit can display the reference signature and the signature read from the signature area 20 on a display device for an operator to make a visual comparison. If the signatures do not correspond, then in step 112 the ballot is rejected as not being verified and the envelope 10 is diverted by the diverter 76 to the reject path 78. Envelopes diverted to the reject path may be subject to some type of additional inspection to make a final determination if the vote should be counted or not. If in step 110 it is determined that the signatures do correspond, then in step 114 the ballot is deemed to be authentic and verified and the envelope 10 is diverted by the diverter 76 to the accept ballot path 80, in which the ballot will be given to ballot counters for tabulation. Preferably, the ballot is removed from the envelope 10 before being given to the ballot counters thereby maintaining a "secret ballot."

It should be noted that the location and orientation of the window need not be as shown and the window can be located and oriented in any position on the envelope. For example, the window could be located along the bottom edge of the envelope, or oriented vertically along a side edge of the envelope.

Thus, according to the present invention, methods and systems that protect the privacy of signatures on ballots sent through the mail are provided. Those skilled in the art will also recognize that various modifications can be made without departing from the spirit of the present invention. While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. An envelope comprising:

a body portion having a pocket for holding contents, the body portion including a signature area;

a flap portion connected to the body portion for covering the pocket when the flap portion is in a closed position, the flap portion including a window that corresponds with the signature area of the body portion when the flap is in the closed position such that signature area is covered by the window, the window having an average transmission rate of visible light such that the window is opaque when illuminated by white light, the window having a transmission rate for a predetermined band of wavelengths of visible light such that when illuminated by light in the predetermined band of wavelengths, the window is at least partially transparent.

2. The envelope according to claim 1, wherein the signature area is formed of a reflective material.

3. The envelope according to claim 1, wherein the average transmission rate of visible light is less than approximately 19%.

4. The envelope according to claim 1, wherein the predetermined band of wavelengths is approximately 620 to 680 nm.

5. The envelope according to claim 1, wherein the window includes a plurality of predetermined bands of wavelengths such that when illuminated by light in any of the plurality of predetermined bands of wavelengths, the window is at least partially transparent.

6. A method for processing a ballot received from a voter in an envelope, the envelope including a signature associated with the voter that is covered by a window, the window having an average transmission rate of visible light such that the window is opaque when illuminated by white light, the window having a transmission rate for a predetermined band of wavelengths of visible light such that when illuminated by light in the predetermined band of wavelengths, the window is at least partially transparent, the method comprising:

illuminating the envelope with light within the predetermined band of wavelengths to reveal the signature associated with the voter that is covered by the window;

reading the signature from the envelope;

comparing the signature read from the envelope with a reference signature to determine authenticity of the ballot; and if the signature read from the envelope compares favorably with the reference signature, accepting the ballot as authentic.

7. The method according to claim 6, wherein if the signature read from the envelope does not compare favorably with the reference signature, the method further comprises:

rejecting the ballot.

* * * * *